(12) United States Patent
Arya

(10) Patent No.: US 11,449,322 B2
(45) Date of Patent: *Sep. 20, 2022

(54) METHOD AND SYSTEM FOR MANAGING THE END TO END LIFECYCLE OF A CLOUD-HOSTED DESKTOP VIRTUALIZATION ENVIRONMENT

(71) Applicant: Desktop 365, Inc., Las Vegas, NV (US)

(72) Inventor: Darshan B. Arya, Corona, CA (US)

(73) Assignee: DESKTOP 365, INC., Las Vegas, NV (US)

(*) Notice: Subject to any disclaimer, the term of this patent is extended or adjusted under 35 U.S.C. 154(b) by 289 days.

This patent is subject to a terminal disclaimer.

(21) Appl. No.: 16/894,865

(22) Filed: Jun. 7, 2020

(65) Prior Publication Data

US 2020/0301690 A1 Sep. 24, 2020

Related U.S. Application Data

(63) Continuation-in-part of application No. 16/408,189, filed on May 9, 2019, now Pat. No. 10,678,526, (Continued)

(51) Int. Cl.
*G06F 8/61* (2018.01)
*G06F 9/455* (2018.01)

(52) U.S. Cl.
CPC .......... *G06F 8/63* (2013.01); *G06F 8/61* (2013.01); *G06F 9/45558* (2013.01); *G06F 2009/4557* (2013.01)

(58) Field of Classification Search
None
See application file for complete search history.

(56) References Cited

U.S. PATENT DOCUMENTS 7,990,962 B2 8/2011 Chang et al.
8,281,175 B2 10/2012 Blackburn et al.
(Continued)

FOREIGN PATENT DOCUMENTS

EP 2433226 A1 3/2012
EP 2433227 A1 3/2012
(Continued)

*Primary Examiner* — Bing Zhao
(74) *Attorney, Agent, or Firm* — Lawrence N. Ginsberg

(57) ABSTRACT

A system for managing the end to end lifecycle of a cloud-hosted desktop virtualization environment within a public cloud service such as Microsoft Azure, Amazon AWS, includes a set of installation tools and an administration portal. A reference architecture for a cloud-hosted virtualization environment defines technology layers. A cloud orchestrator deploys public cloud tenants. A setup wizard tool installs and configures management software components, infrastructure software components, and application images. An environment management module completes the installation and configuration of the management software components of a virtualization environment and provides ongoing management of the infrastructure software and management software components. An image management module stores the configuration of the application images and provides ongoing management of the application images. A catalog management module maintains a library of the application images. A user subscriptions module maintains a record of user subscriptions to the application images in the library.

4 Claims, 13 Drawing Sheets

Related U.S. Application Data which is a continuation of application No. 15/140,744, filed on Apr. 28, 2016, now Pat. No. 10,303,453.

(60) Provisional application No. 62/159,164, filed on May 8, 2015.

(56) References Cited

U.S. PATENT DOCUMENTS

| | | |
|---|---|---|
| 8,346,810 B2 | 1/2013 | Beaverson et al. |
| 8,392,147 B2 | 3/2013 | Karayi et al. |
| 8,463,792 B2 | 6/2013 | Mayo |
| 8,478,799 B2 | 7/2013 | Beaverson et al. |
| 8,489,616 B2 | 7/2013 | Mayo et al. |
| 8,549,518 B1 | 10/2013 | Aron et al. |
| 8,601,473 B1 | 12/2013 | Aron et al. |
| 8,863,124 B1 | 10/2014 | Aron |
| 8,880,544 B2 | 11/2014 | Bowden et al. |
| 8,898,195 B2 | 11/2014 | Beaverson et al. |
| 2008/0269921 A1 | 10/2008 | Banerji et al. |
| 2009/0300593 A1 | 12/2009 | Faus et al. |
| 2010/0229014 A1 | 9/2010 | Blackburn et al. |
| 2011/0016414 A1 | 1/2011 | Ernst et al. |
| 2011/0264931 A1 | 10/2011 | Chang et al. |
| 2012/0166825 A1 | 6/2012 | Blackburn |
| 2012/0191835 A1 | 7/2012 | Blackburn et al. |
| 2012/0239798 A1 | 9/2012 | Cudd et al. |
| 2012/0331029 A1 | 12/2012 | King, III et al. |
| 2013/0014096 A1 | 1/2013 | Mayo et al. |
| 2013/0024615 A1 | 1/2013 | Cordelia et al. |
| 2013/0110894 A1 | 5/2013 | Beaverson et al. |
| 2013/0132800 A1 | 5/2013 | Healey, Jr. et al. |
| 2014/0032449 A1 | 1/2014 | Kacin et al. |
| 2014/0068591 A1 | 3/2014 | Harding et al. |

FOREIGN PATENT DOCUMENTS

| | | |
|---|---|---|
| GB | 201010543 | 8/2010 |
| GB | 2468291 A | 9/2010 |
| GB | 2473194 A | 3/2011 |
| GB | 2473195 A | 3/2011 |
| GB | 2473196 A | 3/2011 |
| GB | 201102402 | 3/2011 |
| GB | 2468291 B | 4/2011 |
| GB | 2474412 A | 4/2011 |
| GB | 2476234 A | 6/2011 |
| GB | 2476650 A | 7/2011 |
| GB | 2476234 B | 11/2011 |
| GB | 2481422 A | 12/2011 |
| GB | 2473195 B | 1/2012 |
| GB | 2473196 B | 1/2012 |
| GB | 2486402 A | 6/2012 |
| GB | 201319182 | 12/2013 |
| GB | 2505436 A | 3/2014 |
| GB | 2505898 B | 11/2014 |
| GB | 2508849 B | 11/2014 |
| GB | 2515114 A | 12/2014 |
| GB | 201419260 | 12/2014 |
| WO | 2012177461 A1 | 12/2012 |
| WO | 2013012663 A2 | 1/2013 |
| WO | 2013078342 A1 | 5/2013 |
| WO | 2013012663 A3 | 6/2013 |
| WO | 2013126680 A1 | 8/2013 |
| WO | 2014200564 A1 | 12/2014 |

Mini Appliance

202

Small Appliance Tower

204

Small Appliance Rackserver

206

Medium Appliance

208
Two Rackservers Configuration

Large Appliance

210
Rack Configuration

Appliance Cluster

212
Multiple Racks Configuration

METHOD AND SYSTEM FOR MANAGING THE END TO END LIFECYCLE OF A CLOUD-HOSTED DESKTOP VIRTUALIZATION ENVIRONMENT

CROSS REFERENCE TO RELATED APPLICATIONS

This application is a continuation-in-part of U.S. application Ser. No. 16/408,189, now U.S. Pat. No. 10,678,526, filed on May 9, 2019, entitled METHOD AND SYSTEM FOR MANAGING THE END TO END LIFECYCLE OF A VIRTUALIZATION ENVIRONMENT, which is a continuation of U.S. application Ser. No. 15/140,744, filed on Apr. 28, 2016, now U.S. Pat. No. 10,303,453, entitled METHOD AND SYSTEM FOR MANAGING THE END TO END LIFECYCLE OF THE VIRTUALIZATION ENVIRONMENT FOR AN APPLIANCE, which claims benefits of U.S. Provisional Application Ser. No. 62/159,164, filed on May 8, 2015, entitled METHOD AND SYSTEM FOR MANAGING THE END TO END LIFECYCLE OF THE VIRTUALIZATION ENVIRONMENT FOR AN APPLIANCE. The entire contents of Ser. Nos. 16/408,189, 15/140,744, 62/159,164 are hereby incorporated by reference herein.

BACKGROUND OF THE INVENTION

1. Field of the Invention

The present invention relates generally to delivery of turnkey cloud-hosted virtual desktops and more particularly to a system for managing the end to end lifecycle across all of the components of a desktop virtualization environment within a public or private cloud in an integrated fashion using a reference architecture.

2. Description of the Related Art

The traditional way the IT (Information Technology) systems are implemented including setup of a virtualization environment requires a set of manual steps for installing and configuring each of the management software and infrastructure software components on the top of a server hardware, manual effort of creating application images, provisioning users and assigning application images to users. These manual steps result in significant amount of effort and any issues with any of the software components may result in months of troubleshooting leading to delays. IT systems are often implemented directly on physical hardware with direct dependency on storage IOPS (Input Output Per Second) performance of the physical hardware. IT systems often lack high availability architecture to achieve the desired levels of reliability.

There has been a partial response to this problem. U.S. Pat. No. 8,863,124 issued to M. Aron entitled, "ARCHITECTURE FOR MANAGING I/O AND STORAGE FOR A VIRTUALIZATION ENVIRONMENT," discloses an improved approach to implement I/O and storage device management in a virtualization environment. According to some approaches disclosed in that patent, a Service VM is employed to control and manage any type of storage device, including directly attached storage in addition to networked and cloud storage. The Service VM implements the Storage Controller logic in the user space, and can be migrated as needed from one node to another. IP-based requests are used to send I/O request to the Service VMs. The Service VM can directly implement storage and I/O optimizations within the direct data access path, without the need for add-on products.

SUMMARY OF THE INVENTION

In a broad aspect, the present invention is a system for managing the end to end lifecycle of a cloud-hosted desktop virtualization environment. The system includes a set of installation tools and an administration portal. The set of installation tools includes a setup wizard tool and a configuration tool. The setup wizard tool is used for installing and configuring management software components, infrastructure software components, and desktop application images in a virtualization environment. The configuration tool provides variables information to the setup wizard tool. The administration portal includes a desktop environment management module, a desktop image management module, a desktop catalog management module, a user subscriptions module, and a user management module, a fabric and an application server. The desktop environment management module completes the installation and configuration of the infrastructure software and management software components of a desktop virtualization environment and provides ongoing management of the infrastructure software and management software components. The desktop image management module completes the configuration of the application images and provides ongoing management of the desktop application images. The desktop catalog management module maintains a library of the desktop application images. The user subscriptions module maintains a record of user subscriptions to the desktop application images in the library. The user management module maintains a record of users in the system. The fabric communicates with the management software components and the infrastructure software components, the fabric comprising a services core, cloud orchestrator, workspace core, and plugins, wherein the plugins use API (Application Protocol Interface) commands. The application server comprises a services façade, a platform service, and, a platform core. The platform service executes automated workflows and uses the platform core to communicate to the services core using pipes. The set of installation tools and the administration portal deploy onto a cloud-hosted desktop virtualization environment. The administration portal enables users to subscribe and access the application images.

In another broad aspect, the invention is embodied as a reference architecture for a cloud-hosted desktop virtualization environment, defining technology layers of the system. The reference architecture includes a business users layer, an applications layer, a management software layer, operating system (OS) layer, an infrastructure software layer, and a cloud layer.

The business users layer describes the use cases of different roles in a system, using application images, wherein user onboarding tools provide business users information about how to use the system. The applications layer describes the application images used by business users and application images configuration information. The management software layer describes the software products used in the cloud environment and software configuration information, wherein the software products create a virtualization environment and manage the application images that are running in virtual machines (VMs) created by an infrastructure software layer. The OS layer describes the operating systems (OSs) and OS configuration information used by the system. The OS templates are managed using an environment management module in an administration portal. The application images are built using the OS templates. The infrastructure software layer describes infrastructure software components used to create a cloud-hosted desktop virtualization environment. The cloud layer manages, configures, provisions, and interfaces with a public or private cloud, wherein a set of installation tools install infrastructure software components for a desktop virtualization environment.

The reference architecture preferably includes a user data layer and a devices layer. The user data layer describes filer server configuration information. User access control to the user data is managed by the administration portal. User data is produced as a result of business users working with the application images. The devices layer describes devices compatible with the system and devices configuration information. The business users are using devices to access application images using a remote access protocol. The integration between the infrastructure software layer and the cloud layer creates high availability architecture.

Other objects, advantages, and novel features will become apparent from the following detailed description of the invention when considered in conjunction with the accompanying drawings.

DETAILED DESCRIPTION OF THE INVENTION

Figure 1:
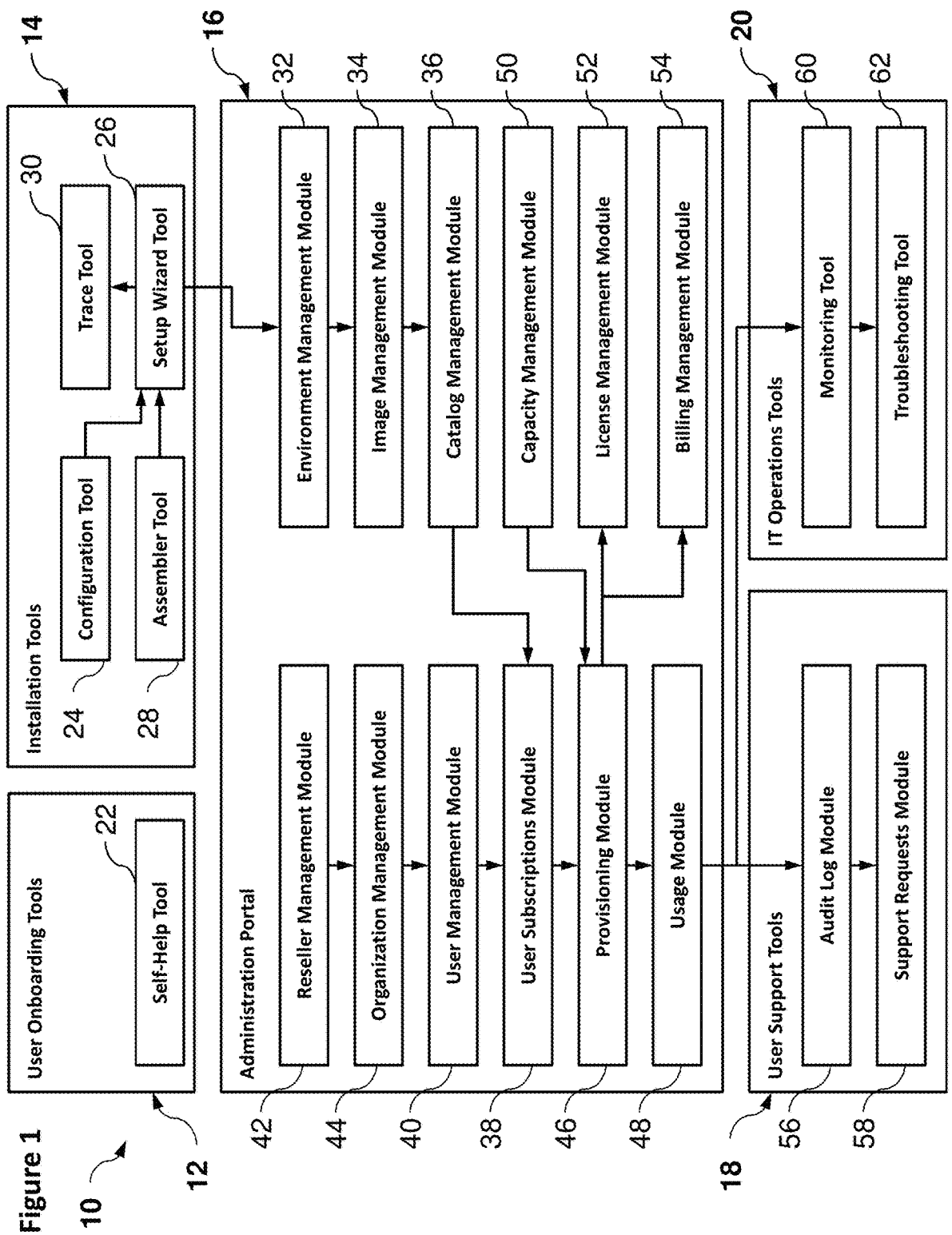
FIG. 1 is a block diagram of the system for managing the end to end lifecycle of a virtualization environment, of the present invention.

Referring now to the drawings and the characters of reference marked thereon, FIG. 1 illustrates the system for managing the end to end lifecycle of a virtualization environment within an appliance, of the present invention, designated generally as 10. The system 10 includes a set of user onboarding tools 12, a set of installation tools 14, an administration portal 16, a set of user support tools 18, and a set of IT (Information Technology) operations tools 20. As used herein the term "virtualization environment" refers to application virtualization, desktop virtualization and server virtualization technologies that allow separation of an application, desktop operating system (OS) or server OS from the physical hardware. Server virtualization is enabled by a hypervisor technology when an OS image is running within a Virtual Machine (VM) created by the hypervisor. Desktop Virtualization is an extension of server virtualization, where additional software component called broker is establishing a remote access protocol connection between the client device and the OS running in a VM. Application virtualization refers to desktop virtualization technologies enabling individual access to applications and application streaming technologies that create a container with an application software and all the relevant OS components required to run this application. The term "appliance" refers to a turnkey IT system, a product resulting from putting together all the required layers of the reference architecture, installing and configuring all the components within each layer and providing a unified user interface to manage the IT system and consume resources of the IT system by business users. The term "installation tools" refers to a set of computer programs that provide automation of the software installation and configuration from bare metal hardware or public cloud to a fully working IT system. The term "administration portal" refers to a web-application that is communicating with the management software and infrastructure software components and automate multiple workflows, including public cloud. The term "user support tools" refers to computer programs enabling resolution of user issues. The term "IT operations tools" refers to computer programs enabling maintenance and troubleshooting of the system.

A set of user onboarding tools 12 preferably includes a self-help tool 22. The self-help tool 22 allows users to access information about how the system works.

A set of installation tools 14 includes configuration tool 24 and setup wizard tool 26.

A configuration tool 24 allows editing and storing in an XML configuration file the standard variables information required by setup wizard tool 26 to install and configure the virtualization environment. This information includes but not limited to IP (Internet Protocol) addresses, time zones, computer host names, domain name, license information, communication ports and other data required to build a virtualization environment.

A setup wizard tool 26 installs and configures infrastructure software, management software and worker VMs on the system. The term "management software" refers to software products that enable server virtualization, desktop virtualization and application virtualization described in a reference architecture as components within management software and infrastructure software layers and are accessed by system administrator. The term "worker VMs" refers to VMs with server OS or desktop OS that are used to run application images and are accessed by users.

In one embodiment, a set of installation tools 14 preferably further includes an assembler tool 28 and trace tool 30. The assembler tool 28 installs a hypervisor on a bare metal server hardware using PXE (preboot execution environment) process and copies the software components to the server hardware. The trace tool 30 provides live insight into the ongoing activities during the setup wizard tool 26 operation and highlights any problems during the configuration process.

The administration portal 16 includes an environment management module 32, an image management module 34, a catalog management module 36, a user subscriptions module 38, and a user management module 40.

The environment management module 32 completes the installation and configuration of the management software components of a desktop virtualization environment and provides ongoing management of the virtualization environment.

The image management module 34 defines each image as a combination of VM, VHD and network templates and is used to configure and manage the application, desktop OS and server OS images.

The catalog management module 36 maintains a library of assets—a set of ready-made images based on the image management module templates. The term "assets" refers to application, desktop OS or server OS images available in the library.

The user subscriptions module 38 maintains a record of user subscriptions to the assets in the library.

The user management module 40 maintains a record of users in the system.

Thus, the set of installation tools 14 and the administration portal 16 convert bare bone hardware into a working virtualization environment. The administration portal 16 enables users to rapidly access applications as per user subscriptions.

The administration portal 16 preferably further includes a reseller management module 42, an organization management module 44, a provisioning module 46, a usage module 48, a capacity management module 50, a license management module 52, and a billing management module 54. The reseller management module 42 creates and manages multiple resellers per virtualization environment. In the cloud-based system described below the reseller management module is for creating and managing multiple customer environments on public cloud. The organization management module 44 creates and manages multiple organizations per one reseller. The provisioning module 46 allocates the necessary compute resources to VMs as per user subscription information. The usage module 48 is tracking the usage of compute resources by the users. The capacity management module 50 is tracking utilization information and generates monthly reports. The license management module 52 is tracking software licensing and application licensing utilization information and generates monthly reports. The billing management module 54 generates monthly invoicing data based on the user subscriptions and generates monthly reports.

The user support tools 18 preferably further includes an audit log module 56 and a support requests module 58. The audit log module 56 is tracking information about all steps involved in user login and application access process. The support requests module 58 is allowing users to submit their issues in form of service requests. In a cloud-based system the audit log module captures cloud environment metrics for user support.

The IT operation tools 20 preferably further includes a monitoring tool 60 and a troubleshooting tool 62. The monitoring tool 60 collects information about hardware utilization and software performance metrics. The troubleshooting tool 62 enables engineers to quickly collect the required system information to troubleshoot user issues. In a cloud-based system the monitoring tool collects information about the cloud-environment utilization and management software performance metrics.

Figure 2:
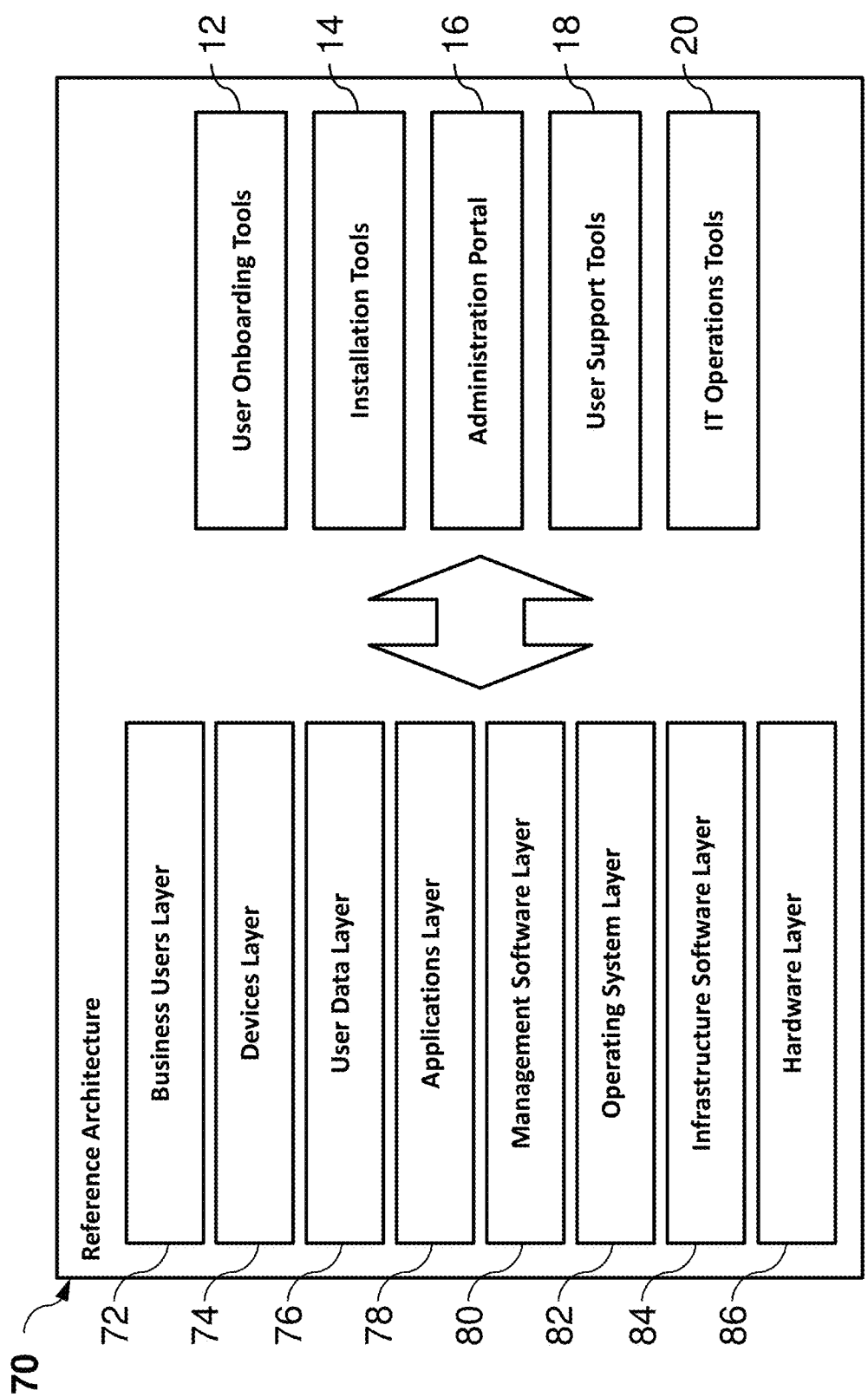
FIG. 2 is a block diagram of the reference architecture for an appliance, in accordance with the principles of the present invention.

Referring now to FIG. 2, the reference architecture of the appliance of the present invention is illustrated, designated generally as 70. The reference architecture 70 includes multiple architecture layers such as business users layer 72, applications layer 78, management software layer 80, operating system layer 82, infrastructure software layer 84, and hardware layer 86.

The business users layer 72 is describing the use cases of users in different roles using the system.

The applications layer 78 is describing the applications used in the system and application configuration information.

The management software layer 80 describes the software products used in the system along with their configuration information.

The operating system layer 82 describes the OSs used by the system along with the Oss configuration information.

The infrastructure software layer 84 describes the infrastructure software components such as hypervisor, host OS, and software defined storage.

The hardware layer 86 describes standard server hardware configuration including bill of material information.

The reference architecture 70 preferably further includes additional architecture layers such as devices layer 74 and user data layer 76. The devices layer 74 describes the devices compatible with the virtualization environment and defines a device configuration information. The user data layer 76 describes the configuration information of file servers and methods to manage file access by users.

Figure 3:
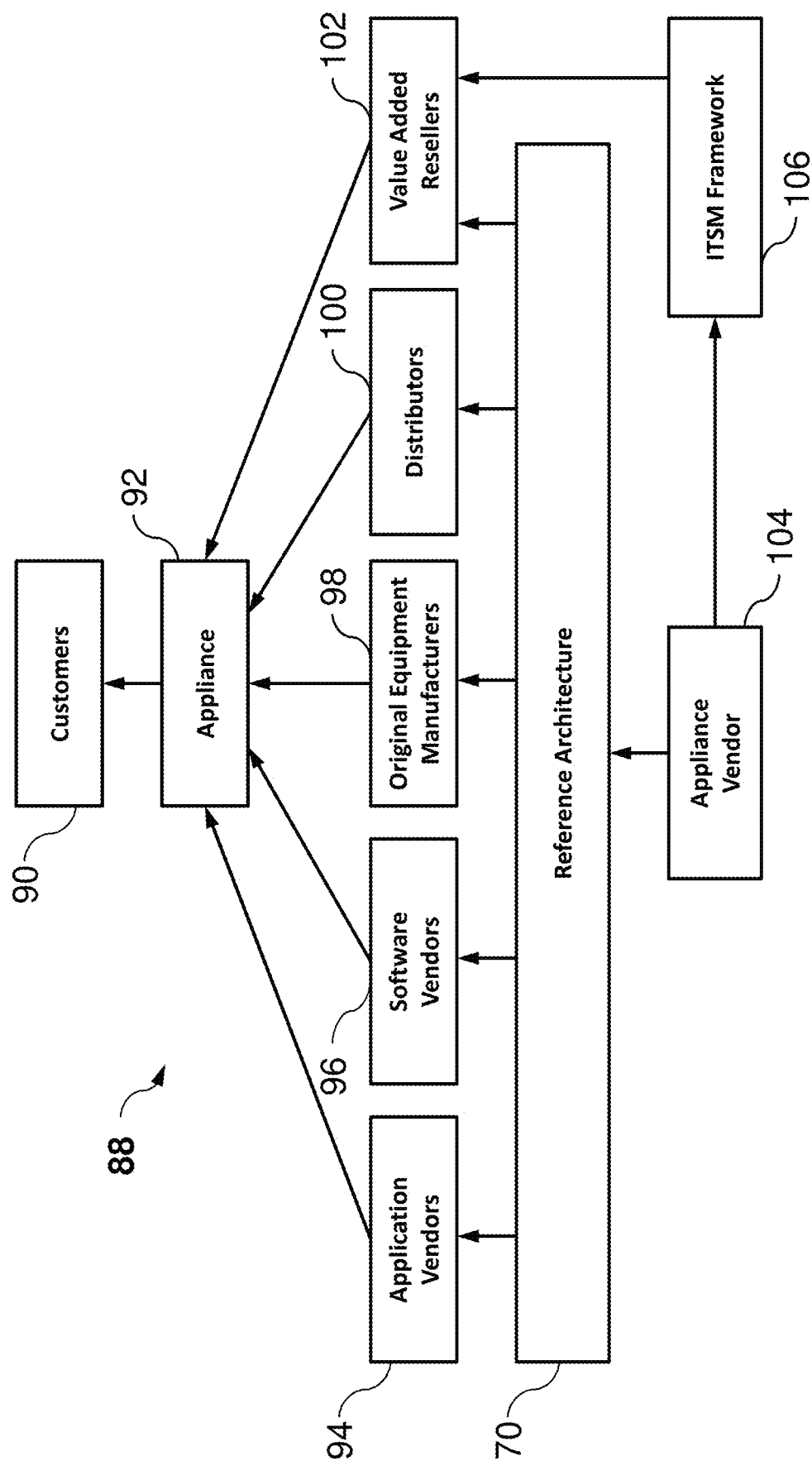
FIG. 3 is a block diagram of the partner ecosystem for delivering an appliance to a customer, of the present invention.

Referring now to FIG. 3, a partner ecosystem for delivering the appliance of the present invention is illustrated, designated generally as 88. The partner ecosystem 88 defines partner ecosystem players such as customers 90, software vendors 96, original equipment manufacturers (OEMs) 98, value added resellers 102, and appliance vendor 104.

The customers 90 are the final receivers and users of the appliance 92.

The software vendors 96 provide the management, operating system and infrastructure software products used within the reference architecture 70 of the appliance 92.

The original equipment manufacturer 98 is responsible for assembly of appliance hardware based on reference architecture 70.

The value added resellers 102 are responsible for services of implementing and supporting the appliance 92.

The appliance vendor 104 is responsible for creating the reference architecture 70, including an administration portal and other tools, and providing the ITSM Framework 106 to the value added resellers 102.

The partner ecosystem 88 preferably further includes additional partner ecosystem players such as application vendors 94 and distributors 100. The application vendors 94 provide the application software used within the reference architecture 70. Distributors 100 are responsible for resell and delivery of the appliance hardware to the customer, resell of software licensing and application licensing.

Figure 4:
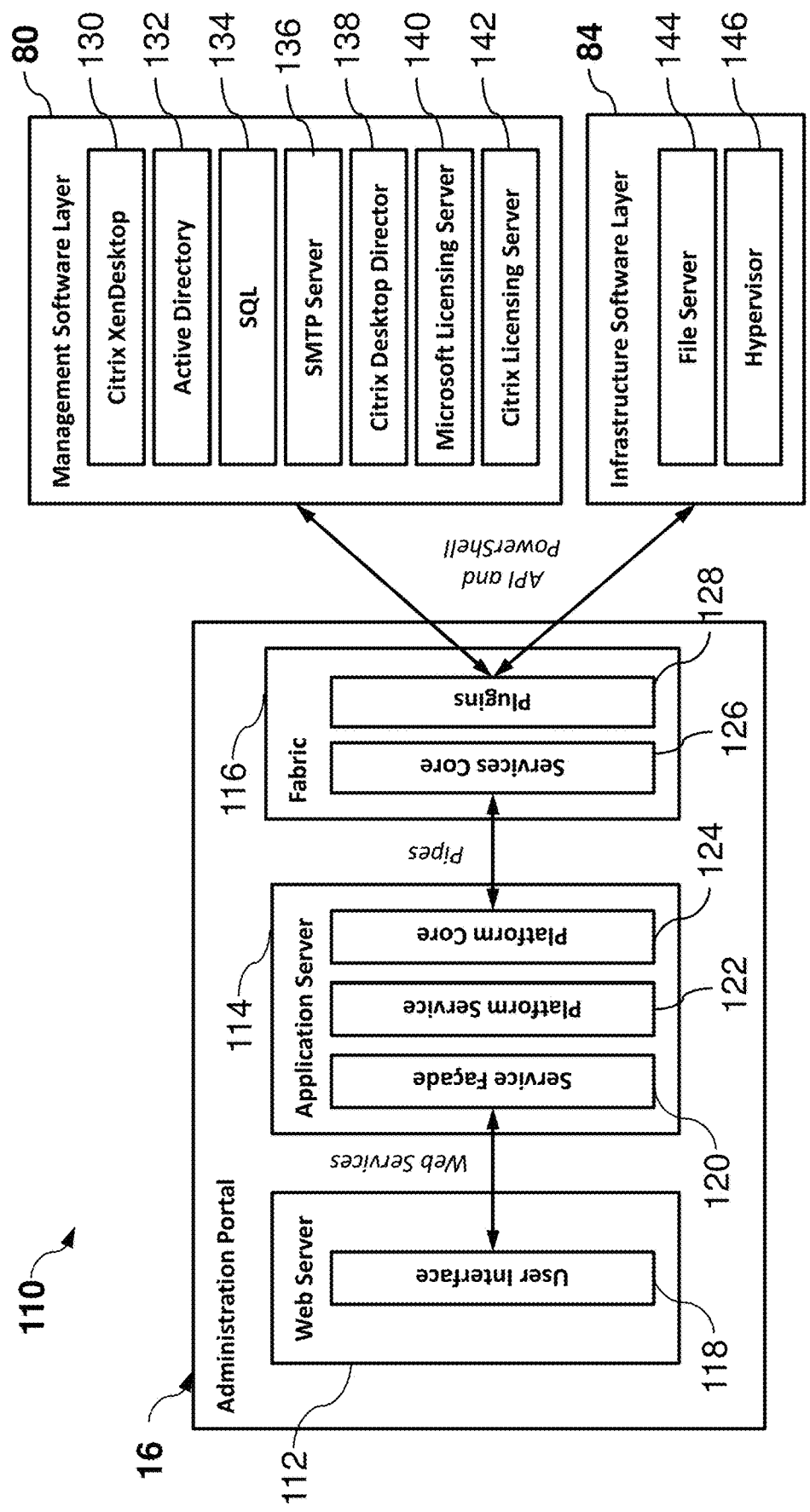
FIG. 4 is a block diagram of the integration of the administration portal, management software, and infrastructure software, of the present invention.

Referring to FIG. 4 that illustrates integration between the administration portal 16 with management software layer 80 and infrastructure software layer 84 of the present invention, designated generally as 110. The administration portal 16 includes a web server 112, an application server 114 and a fabric 116. The management software layer 80 includes a Citrix XenDesktop 130, an active directory 132, and a SQL 134. The infrastructure software layer 84 includes a file server 144 and a hypervisor 146.

The web server 112 is providing the user interface 118 of the administration portal 16 and is connected using web services to the services façade 120 of the application server 114.

The platform service 122 of the application server 114 is executing the automated workflows and is using platform core 124 to communicate to services core 126 of the fabric 116 using pipes.

The services core 126 is using plugins 128 to communicate to components of the management software layer 80 and infrastructure software layer 84.

The management software layer 80 preferably further includes an SMTP server 136, a Citrix Desktop Director 138, a Microsoft Licensing Server 140, and a Citrix Licensing Server 142

Figure 5:
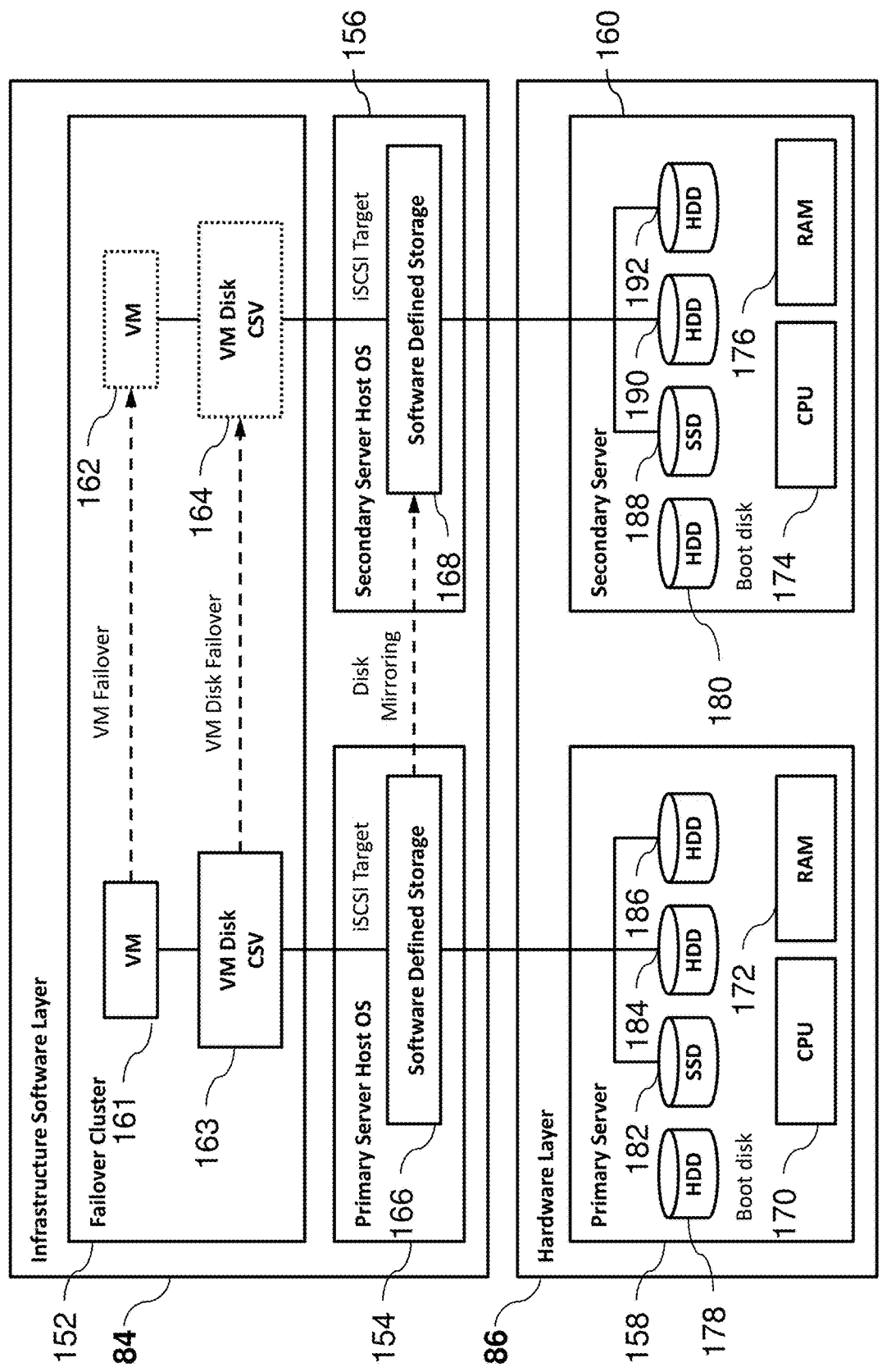
FIG. 5 is a block diagram illustrating the integration of the infrastructure software layer and the hardware layer of the reference architecture.
Figure 6A:
FIGS. 6A-F illustrate a series of appliances based on the reference architecture.
Figure 6B:
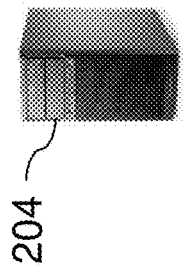
Figure 6C:
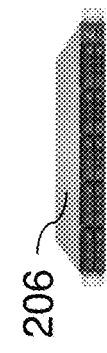
Figure 6D:
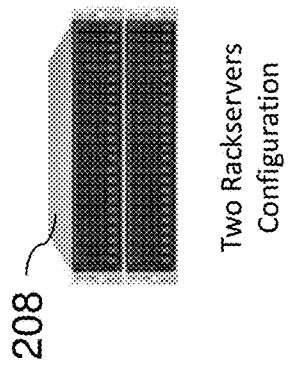
Figure 6E:
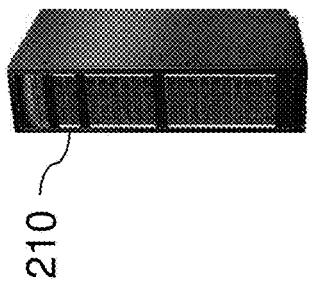
Figure 6F:
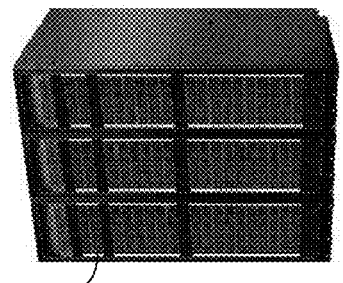

Referring to FIG. 5, integration between the hardware layer 86 and infrastructure software layer 84, of the present invention, is illustrated, designated generally as 150. The hardware layer 86 includes primary server 158 and secondary server 160. The infrastructure software layer 84 is configured with a failover cluster 152 between primary server 158 and secondary server 160.

The failover cluster 152 is configured to manage high availability of a VM 161 provisioned on the top of a VM Disk CSV (Clustered Shared Volume) 163. In the event of primary server 158 failure, the CSV transitions a VM Disk CSV 163 to a VM Disk CSV 164 (VM Disk Failover). In the event of primary server 158 failure the failover cluster migrates the VM 161 running on the top of the VM Disk CSV 163 to a VM 162 on the top of a newly created VM Disk CSV 164 (VM Failover).

The VM Disk 163 is working off the iSCSI target provided by a software defined storage 166. The software defined storage 166 is configured in synchronous disk mirroring with software defined storage 168 that is servicing the iSCSI target to the VM Disk CSV 164. In such configuration, the data in the VM Disk CSV 164 is exactly the same as in the VM Disk CSV 163 that allows VM failover without any data loss.

The primary server 158 has an HDD (Hard Disk Drive) 178 used as a boot disk. The secondary server 160 has an HDD 180 used as a boot disk.

The primary server 158 has a combination of an SSD (Solid State Drive) 182, an HDD 184 and an HDD 186 configured under software defined storage 166 in auto-tiering mode. The primary server 158 has a CPU 170 and a RAM (Random Access Memory) 172 that are configured based on the workload of the server as per reference architecture and in alignment with in memory caching requirements of the software defined storage 166.

The secondary server 160 has a combination of an SSD (Solid State Drive) 188, an HDD 190 and an HDD 192 configured under software defined storage 168 in auto-tiering mode. The secondary server 160 has a CPU 174 and a RAM 176 that are configured based on the workload of the server as per reference architecture and in alignment with in memory caching requirements of the software defined storage 168.

Referring to FIGS. 6A-6F, a series of appliances based on reference architecture are illustrated. The series of appliances include mini appliance 202, small appliance tower 204, small appliance rackserver 206, medium appliance 208 in two rackservers configuration, large appliance 210 in rack configuration, and appliance cluster 212 in multiple racks configuration.

The mini appliance 202 is designed as a demo kit and for running up to 20 application virtualization users.

The small appliance tower 204 and small appliance rackserver 206 are designed for less than 50 user capacity.

The medium appliance 208 in two rackservers configuration is designed for up to 500 user capacity.

The large appliance 210 in a rack configuration is designed for up to 3000 user capacity.

The appliance cluster 212 in multiple racks configuration is designed for more than 3000 user capacity.

Figure 7B:
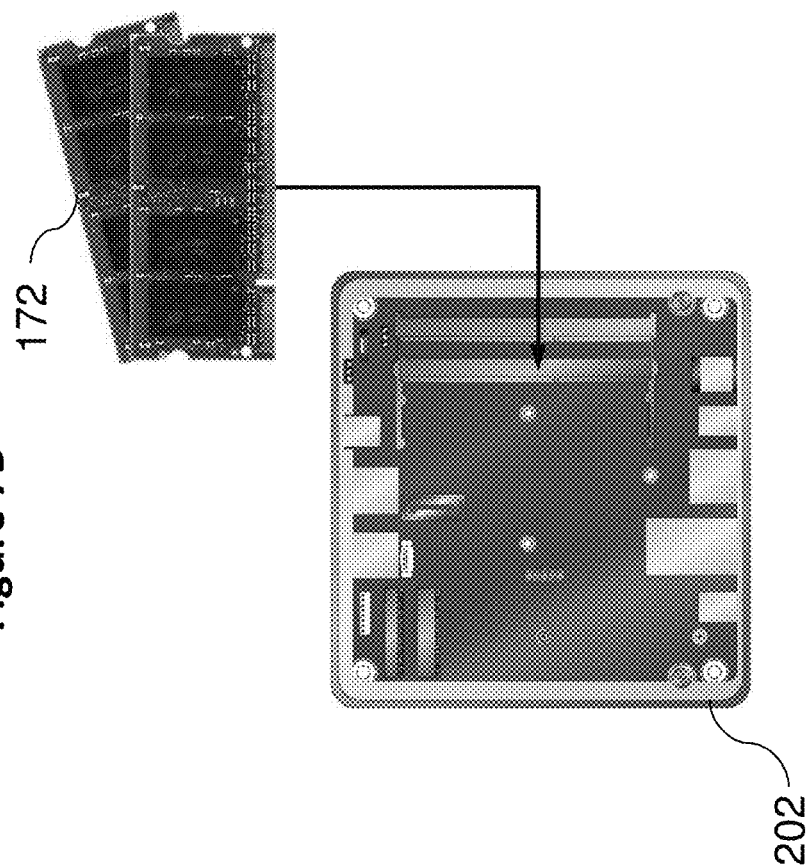
FIGS. 7A-B are mechanical diagrams illustrating a mini appliance.
Figure 7A:
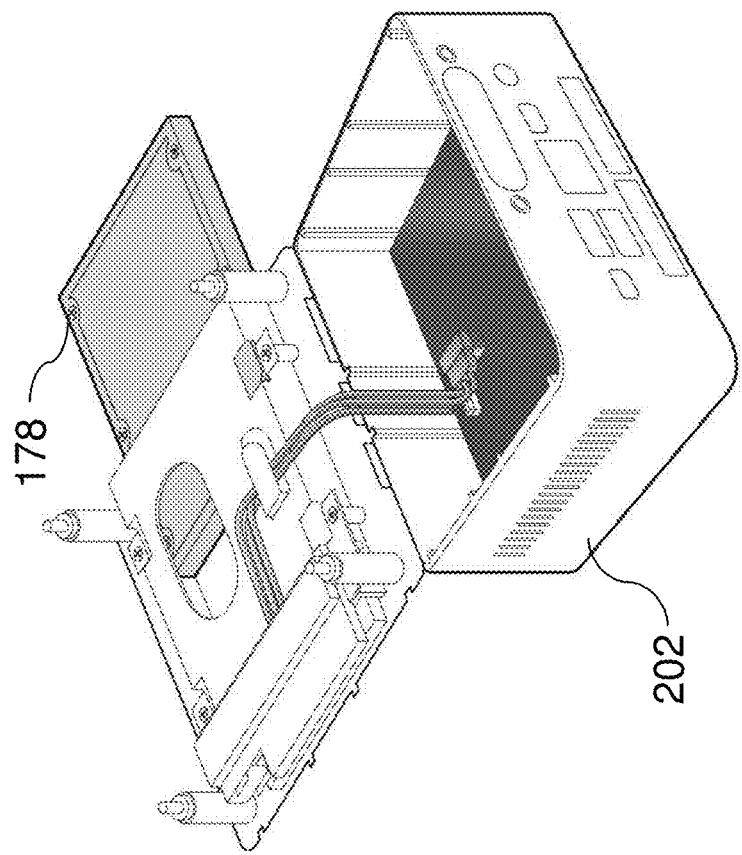

Referring to FIGS. 7A-7B, mechanical diagrams of the mini appliance 202 are illustrated. The mini appliance 202 includes an HDD 178. The mini appliance 202 includes a RAM 172.

The HDD 178 is used as a boot drive for the mini appliance.

The RAM 172 is the computer memory of a certain capacity predefined in the reference architecture and installed on to the motherboard of the mini appliance 202.

Figure 8:
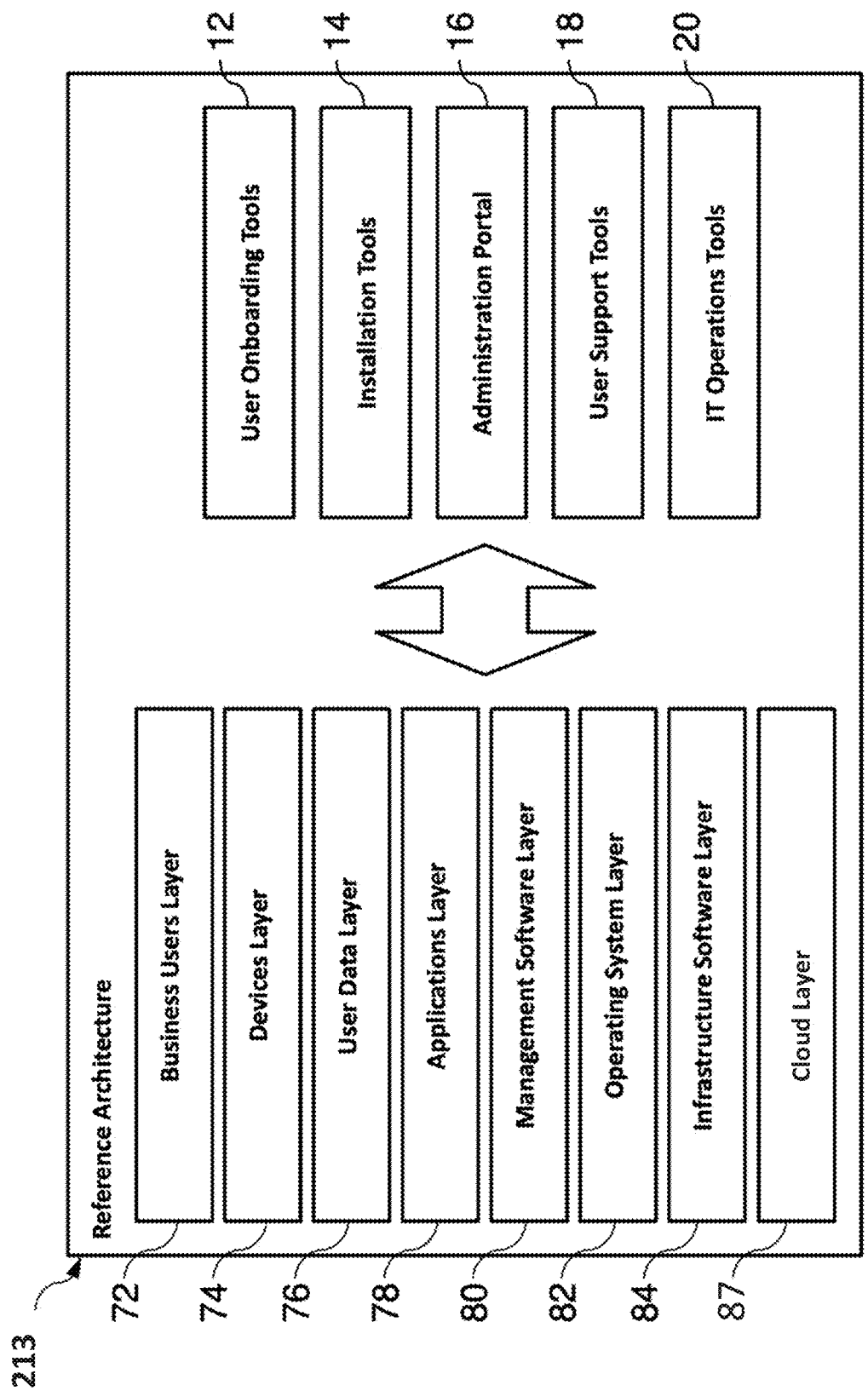
FIG. 8 is a block diagram illustrating an embodiment of the present invention and incorporates a cloud layer.

The concepts herein can be extended for application with a cloud software layer that provides cloud-hosted desktops on public cloud infrastructure. Referring now to FIG. 8, an example of the reference architecture for such a cloud-based system 213 is illustrated. The reference architecture 213 includes multiple architecture layers such as business users layer 72, applications layer 78, management software layer 80, operating system layer 82, and infrastructure software layer 84, as was the case in the reference architecture described relative to FIG. 2. However, in this instance the hardware layer 86 has been replaced by a cloud layer 87.

This cloud-based system 213 includes the installation tools 14 discussed above relative to FIG. 1 where the term "installation tools" broadly includes deployment of this system 213 on private cloud and public cloud infrastructure. Components of the installation tools such as the setup wizard tool and configuration tool apply similarly to this cloud-based system 213, as discussed above relative to FIGS. 1-7. With this cloud-based system the variables information may be customizable. Similarly, components of the administration portal such as the desktop environment management module, desktop image management module, desktop catalog management module, user management module, etc. apply similarly to this cloud-based system 213, as discussed above relative to FIGS. 1-7.

Figure 9:
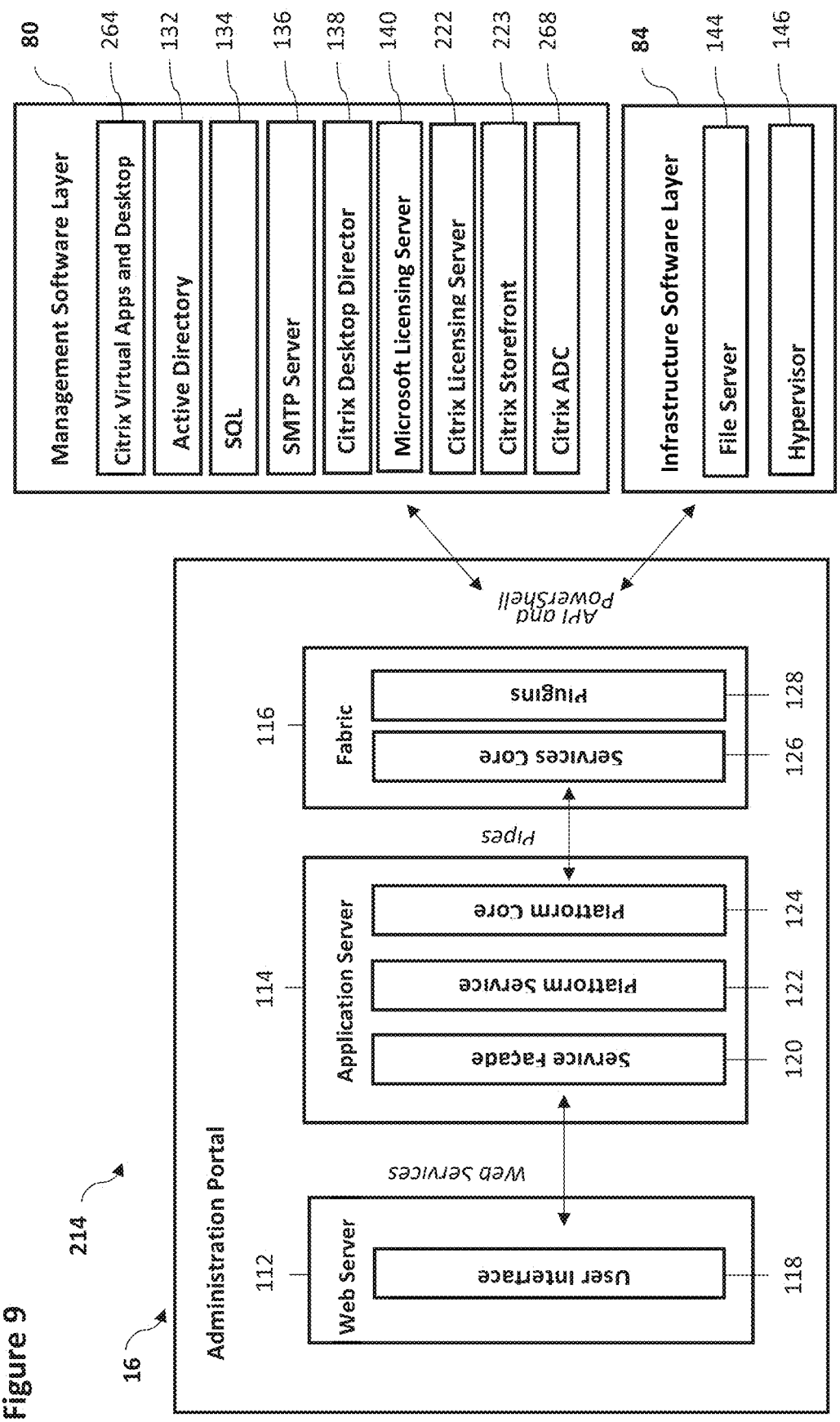
FIG. 9 is a block diagram illustrating an embodiment of the present invention illustrating the integration of the administration portal, management software, and infrastructure software based on Citrix technology.

Referring now to FIG. 9, the integration between the administration portal 16 with management software layer 80 and infrastructure software layer 84 of the present invention, designated generally as 214, is shown based on Citrix technology. The administration portal 16 includes a web server 112, an application server 114 and a fabric 116. The management software layer 80 includes a Citrix Virtual Apps and Desktop 264, an active directory 132, SQL 134, Citrix Desktop Director 138, Microsoft Licensing Server 140, Citrix Licensing Server 222, Citrix Storefront 223, and Citrix ADC 268. The infrastructure software layer 84 includes a file server 144 and a hypervisor 146.

Figure 10:
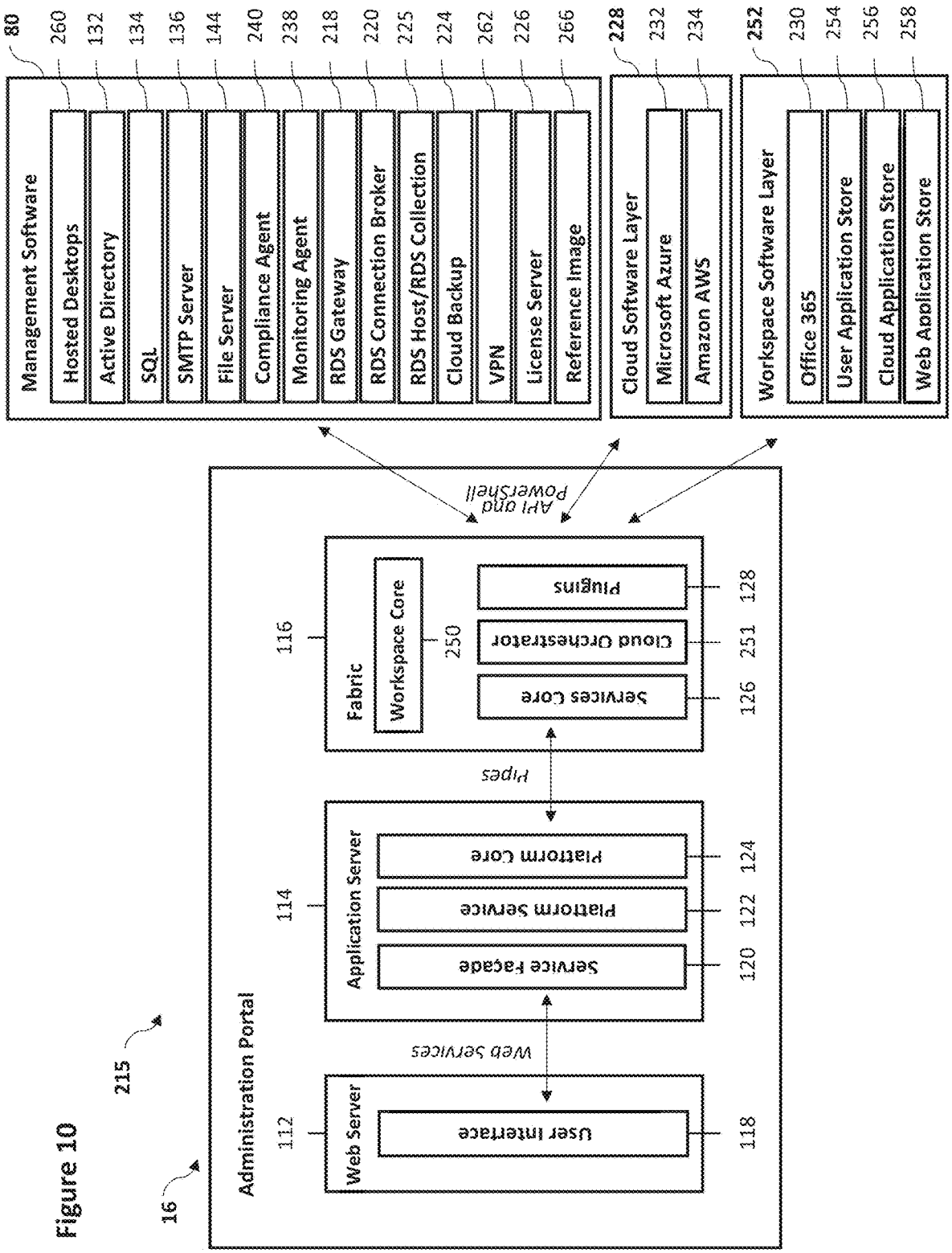
FIG. 10 is a block diagram illustrating an embodiment of the present invention implemented as a system that provides cloud-hosted desktops based on Microsoft remote desktop technology.

Referring now to FIG. 10, an embodiment of the present invention implemented as a system that provides cloud-hosted desktops based on Microsoft remote desktop technology is illustrated, designated generally as 215. As in the previous embodiment the administration portal 16 includes a web server 112, an application server 114 and a fabric 116. However the fabric includes a workspace core 250 and a cloud orchestrator 251. The management software layer 80 includes hosted desktops 260, active directory 132, SQL 134, SMTP server 136, file server 144, compliance agent 240, monitoring agent 238, RDS gateway 218 for remote connectivity, RDS connection broker 220 for managing incoming connecting requests, RDS Host/RDS collection 225 for cloud-hosted virtual desktops, cloud backup 224, VPN 262, and license server 226, reference image 266. The monitoring agent layer 238 provides vital health information on the environment and provides the ability to proactively receive alerts and recommendations. The compliance agent layer 240 provides an assessment and recommendations for vital security improvements needed to maintain best practices for compliance.

The reference image 266 provides a series of standardized operating system images that serve as a template by which to provision cloud-hosted desktops.

A cloud software layer 228 includes Microsoft Azure 232 and Amazon AWS 234. The cloud software layer 228 provides the ability to connect to a public cloud tenant from Microsoft Azure or Amazon AWS and provision all of the components and infrastructure of the present invention. It also allows the ongoing management, administration and configuration within the present invention.

A workspace software layer 252 includes Office 365 (230), User application store 254, cloud application store 256, and Web application store 258. This and other embodiments discussed below enable the ability to incorporate a variety of third party applications, public web applications, and ability to manage and customize workflows to deliver applications on virtual desktops based on user and department needs.

The Cloud Application Store 256 includes an API for interfacing with public cloud applications such as Microsoft Office 365, and integrating them into the present system 215.

Figure 11:
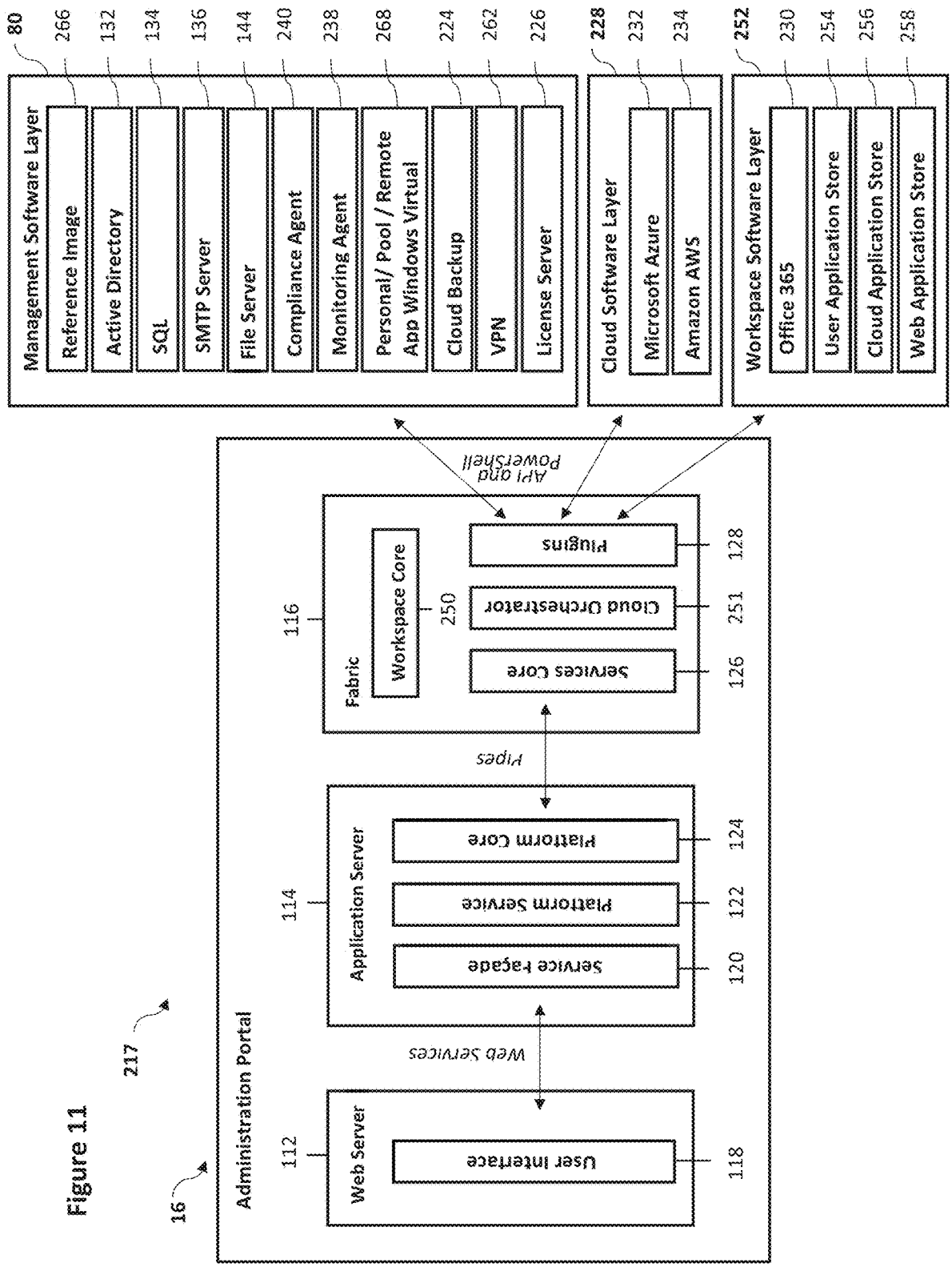
FIG. 11 is a block diagram illustrating an embodiment of the present invention implemented as a system that provides personal, pooled and remote app versions of windows virtual desktop ("WVD").

Referring now to FIG. 11, an embodiment of the present invention implemented as a system that provides personal, pooled and remote app versions of windows virtual desktop ("WVD"), is illustrated, designated generally as 217. As in the previous embodiment the administration portal 16 includes a web server 112, an application server 114 and a fabric 116. As in the previous embodiment the fabric includes a workspace core 250 and a cloud orchestrator 251. The management software layer 80 includes reference image 266, active directory 132, SQL 134, SMTP server 136, file server 144, compliance agent 240, monitoring agent 238, personal/pool/remote app Windows Virtual Desktop 268, cloud backup 224, VPN 262, and license server 226. The personal/pool/remote app Windows Virtual Desktop provides virtual desktop deployments in a variety of use cases.

A cloud software layer 228 includes Microsoft Azure 232 and Amazon AWS 234.

A workspace software layer 252 includes Office 365 (labeled 230), User application store 254, cloud application store 256, and Web application store 258.

Figure 12:
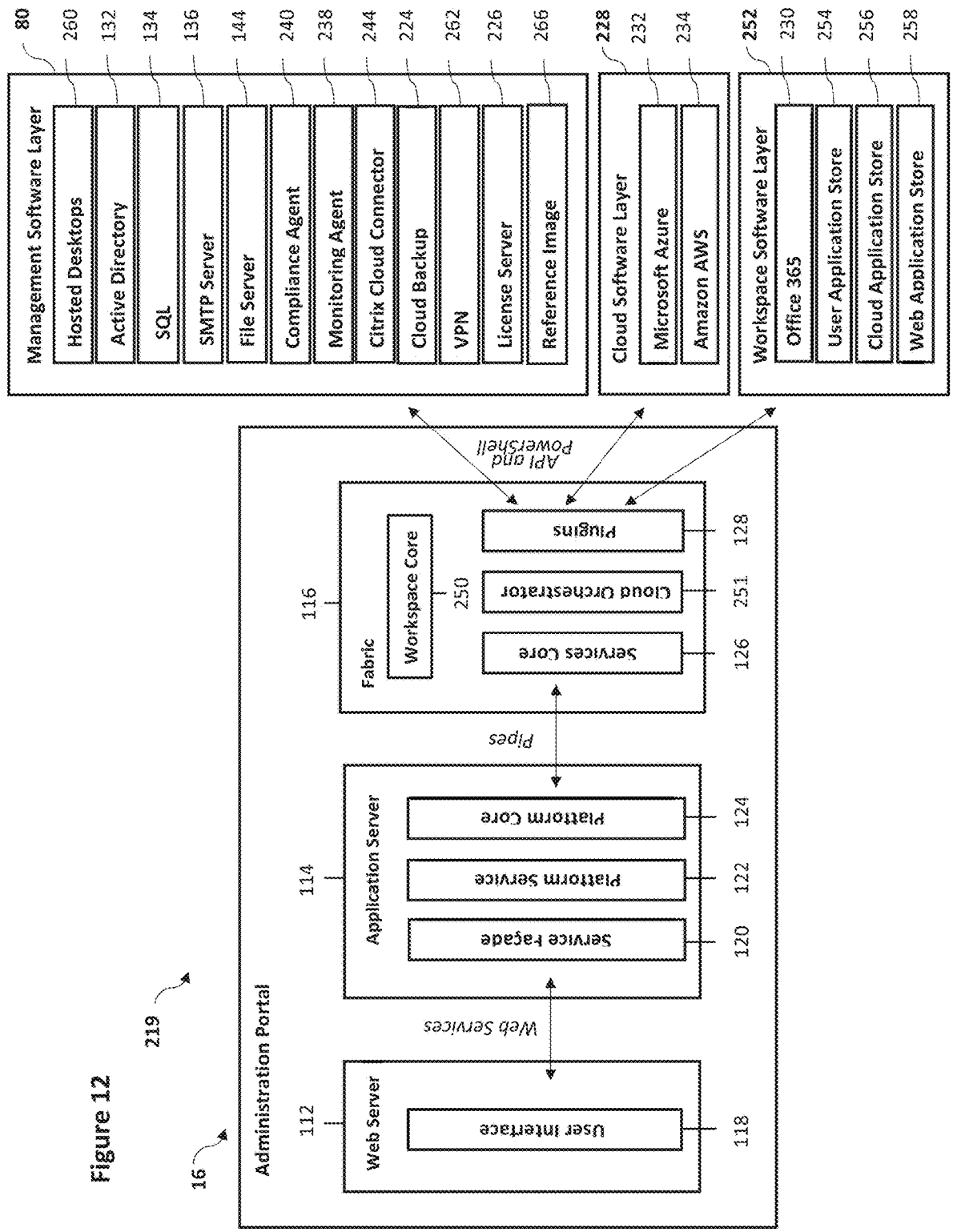
FIG. 12 is a block diagram illustrating an embodiment of the present invention implemented as a system that provides virtual desktops and integrates with Citrix cloud technology.

FIG. 12 is an embodiment of the present invention implemented as a system, designated generally as 219 that provides virtual desktops and integrates with Citrix cloud technology. As in the previous embodiment the administration portal 16 includes a web server 112, an application server 114 and a fabric 116. As in the previous embodiment the fabric includes a workspace core 250 and a cloud orchestrator 251. The management software layer 80 includes hosted desktops 260, active directory 132, SQL 134, SMTP server 136, file server 144, compliance agent 240, monitoring agent 238, Citrix cloud connector 244, cloud backup 224, VPN 262, license server 226, and reference image 266. The cloud-hosted desktops 260 integrate Citrix technology. The Citrix cloud connector layer 244 provides integration and automated installation of the Citrix cloud connector 244 enabling communication between the Citrix cloud and the present system resulting in generating Hosted Desktops.

A cloud software layer 228 includes Microsoft Azure 232 and Amazon AWS 234.

A workspace software layer 252 includes Office 365 (labeled 230), User application store 254, cloud application store 256, and Web application store 258.

Figure 13:
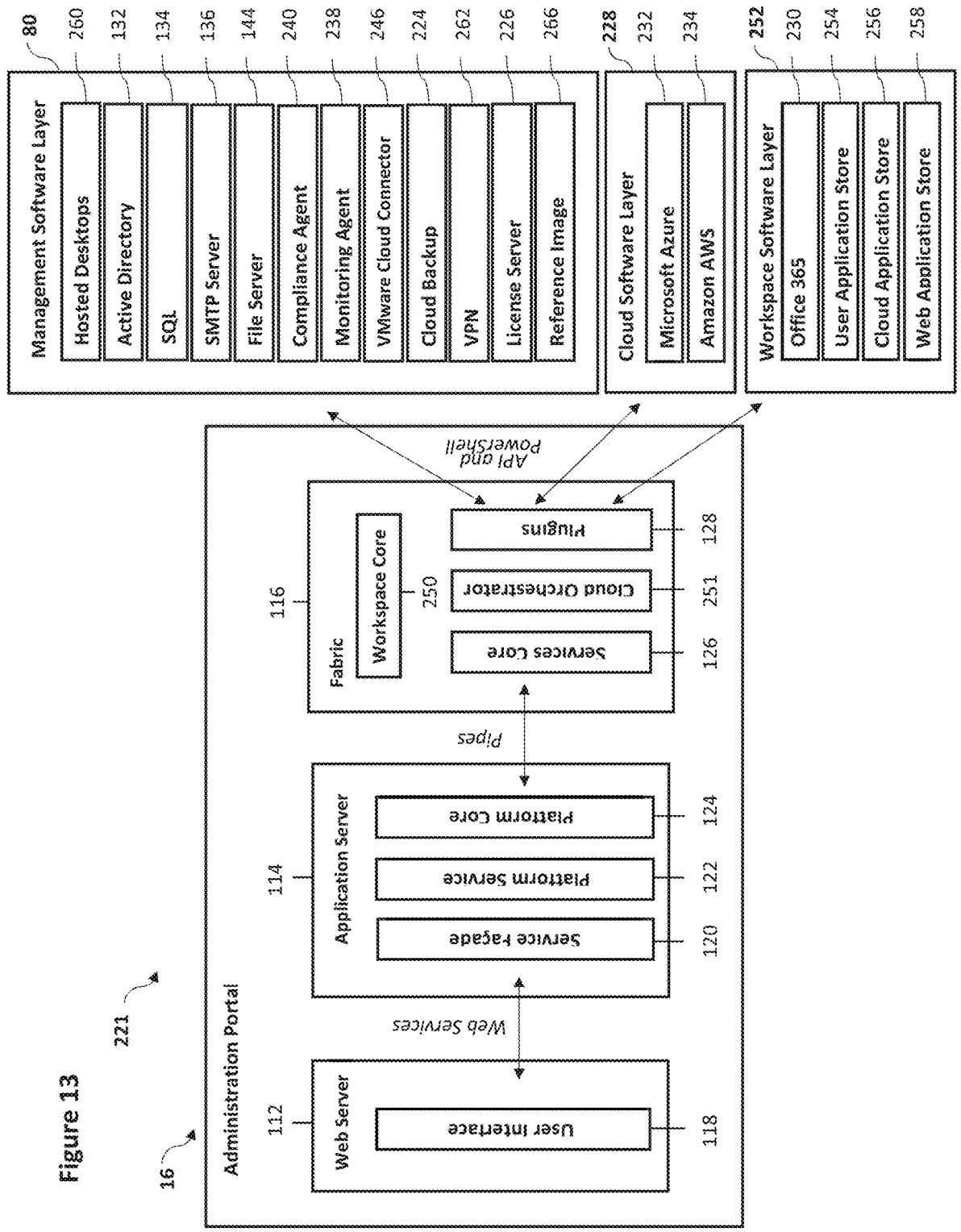
FIG. 13 is a block diagram illustrating an embodiment of the present invention implemented as a system that provides virtual desktops and integrates with VMWare cloud technology

Referring now to FIG. 13, an embodiment of the present invention implemented as a system that provides virtual desktops and integrates with VMWare cloud technology, is illustrated designated generally as 221. As in the previous embodiment the administration portal 16 includes a web server 112, an application server 114 and a fabric 116. As in the previous embodiment the fabric includes a workspace core 250 and a cloud orchestrator 251. The management software layer 80 includes hosted desktops 260, active directory 132, SQL 134, SMTP server 136, file server 144, compliance agent 240, monitoring agent 238, VMware cloud connector 246, cloud backup 224, VPN 262, license server 226, and reference image 266. The VMware cloud connector layer 246 provides integration and automated installation of the VMware cloud connector of the VMware Horizon Cloud platform, enabling communication between the VMware Horizon Cloud and the present system resulting in generating Hosted Desktops.

A cloud software layer 228 includes Microsoft Azure 232 and Amazon AWS 234.

A workspace software layer 252 includes Office 365 (labeled 230), User application store 254, cloud application store 256, and Web application store 258.

The inventions discussed herein can be marketed under the trademark Desktop365™.

Other embodiments and configurations may be devised without departing from the spirit of the invention and the scope of the appended claims.

The invention claimed is:

1. A system for managing the end to end lifecycle of a cloud-hosted desktop virtualization environment, comprising:
one or more hardware servers across different cloud infrastructures of the cloud-hosted desktop virtualization environment;
   a) a set of installation tools, comprising:
      i) a setup wizard tool for installing and configuring desktop management software components, infrastructure software components, and desktop application images in a virtualization environment; and,
      ii) a configuration tool providing variables information to the setup wizard tool; and,
   b) an administration portal, comprising:
      i) a desktop environment management module for completing the installation and configuration of the infrastructure software and management software components of a desktop virtualization environment and providing ongoing management of the infrastructure software and management software components;
      ii) a desktop image management module for completing the configuration of the desktop application images and providing ongoing management of the desktop application images;

iii) a desktop catalog management module for maintaining a library of the desktop application images;

iv) a user subscriptions module for maintaining a record of user subscriptions to the desktop application images in the library;

v) a user management module for maintaining a record of users in the system;

vi) a fabric for communication with the management software components and the infrastructure software components, said fabric comprising a services core, cloud orchestrator, workspace core, and plugins, wherein the plugins use API (Application Protocol Interface) commands; and, vii) an application server comprising a services façade, a platform service, and, a platform core, wherein the platform service executes automated workflows and uses the platform core to communicate to the services core using pipes;

wherein the set of installation tools and the administration portal are distributedly executing on the one or more hardware servers across different cloud infrastructures of the cloud-hosted desktop virtualization environment and wherein the administration portal enables users to subscribe and access the virtual desktop application images.

2. The system of claim 1, wherein said administration portal further comprises, a) a reseller management module for creating and managing multiple customer environments on public cloud;

b) an organization management module for creating and managing multiple organizations per one reseller, with one or multiple organizations per a customer;

c) a billing management module for generating monthly invoicing based on user subscriptions; and, d) a license management module for generating monthly software licensing utilization reports;

e) a capacity management module for generating capacity utilization reports;

f) a provisioning module for provisioning application images to users based on the user subscriptions; and, g) a usage module for generating monthly usage reports based on the user subscriptions.

3. The system of claim 1, further comprising a set of user support tools further comprising, a) an audit log module to track user activities and cloud environment metrics for user support purposes; and, b) a support requests module for users to submit support requests in the system.

4. The system of claim 1, further comprising a set of information technology (IT) operations tools further comprising, a) a monitoring tool to collect information about the cloud-environment utilization and management software performance metrics; and, b) a troubleshooting tool for an engineer to quickly collect required information to troubleshoot user issues.

* * * * *